July 22, 1947.  C. V. JOHNSON ET AL  2,424,276
CONTROL MECHANISM FOR CAMERA MOTORS
Filed Feb. 7, 1944  2 Sheets-Sheet 1

INVENTORS
Carl V. Johnson
William G. Herbstreit
BY
Blair, Curtis & Hayward
ATTORNEYS

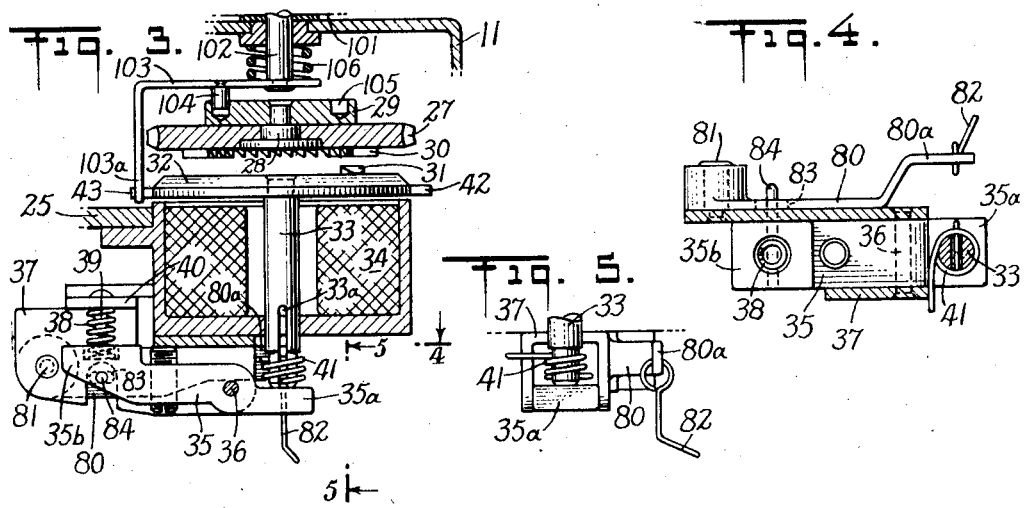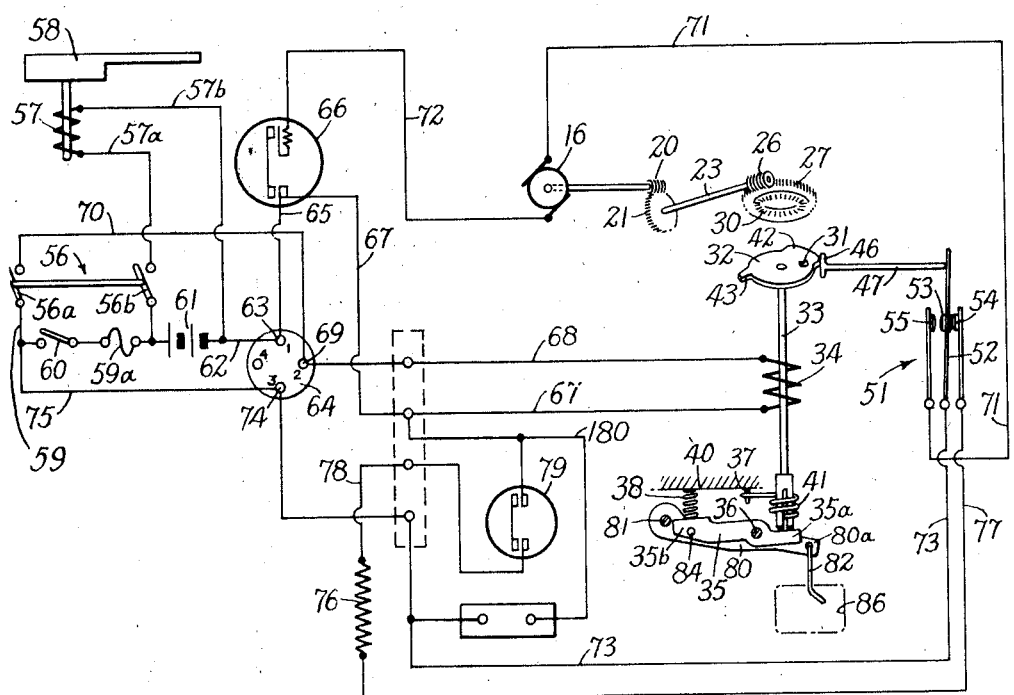

Patented July 22, 1947

2,424,276

UNITED STATES PATENT OFFICE 2,424,276

CONTROL MECHANISM FOR CAMERA MOTORS

Carl V. Johnson, Kew Gardens, and William G. Herbstreit, Forest Hills, N. Y., assignors to Fairchild Camera and Instrument Corporation, a corporation of Delaware Application February 7, 1944, Serial No. 521,388

13 Claims. (Cl. 172—179)

This invention relates to photographic apparatus, and more particularly to a motion picture camera adapted to record the results of aircraft machine gun fire during combat, or to record actual or simulated machine gun fire during combat training.

One of the objects of this invention is to provide an extremely light, compact and rugged camera, capable of efficient and reliable operation under conditions of rigorous use. Another object is to provide a camera of the above nature which is of simple and relatively inexpensive construction, and also which may readily be installed for operation. Another object is to provide a camera of the above nature capable of dependably recording the effect of projectiles in the air after the gun or guns cease firing. Other objects will be in part apparent and in part pointed out hereinafter.

The invention accordingly consists in the features of construction, combinations of elements, and arrangements of parts, as will be exemplified in the structure to be hereinafter described, and the scope of the application of which will be indicated in the following claims.

In the drawing, wherein there is shown one form of our invention,

Figure 3 is a section taken along the line 3—3 of Figure 2;

Figure 4 is a section taken along the line 4—4 of Figure 3;

Figure 5 is a fragmentary elevation as viewed along the line 5—5 of Figure 3; and, Figure 6 is the wiring diagram of the camera incorporated schematically a portion of the operating mechanism thereof.

Similar reference characters refer to similar parts throughout the various views of the drawing.

In so far as various of the structural features of the camera described hereinabove, such as the shutter and magazine operating mechanisms, magazine position control, shutter speed operation control, etc., are concerned, the camera in general resembles that disclosed in the copending application of Gaty and Rattray, Serial No. 395,098, filed May 24, 1941, now United States Patent 2,342,509. The invention herein is accordingly directed to improved means for continuing the operation of the camera for a predetermined interval of time after the gun or guns on the airplane have ceased firing.

Figure 1:
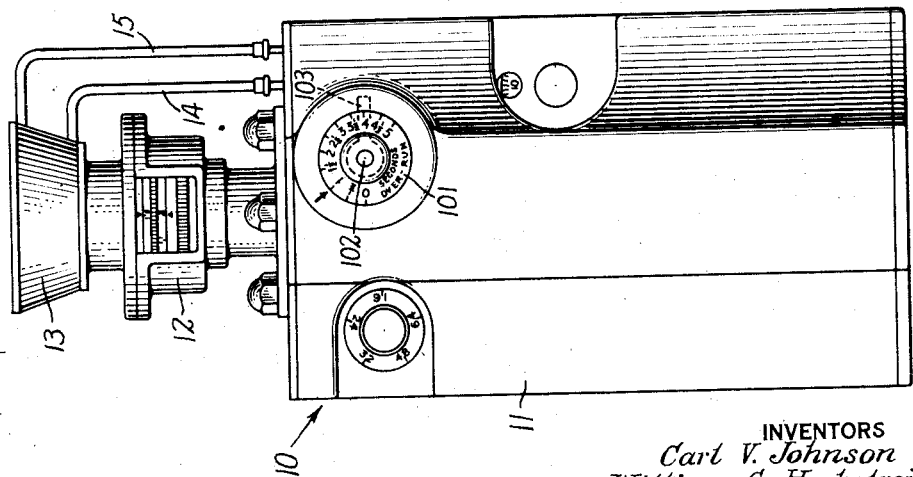
Figure 1 is a plan view of our camera.

Referring to Figure 1, our camera is generally indicated at 10, and comprises a case 11, lens mount 12 and a heater unit 13, which is electrically connected to a socket within the camera case by a pair of flexible leads 14 and 15. Preferably the camera is of the type adapted to use 16 mm. film, and is accordingly extremely light in weight and compact so as to permit easy installation on the aircraft, while adding only a negligible amount of weight thereto.

Various of the mechanisms within camera 10 are driven by a motor 16 (Figure 2) which drives a bevel gear 17 driven by the motor's rotor shaft through suitable reduction gearing (not shown). Bevel gear 17 meshes with a bevel gear 18 secured to one end of a shaft 19, the other end of which has fastened thereto a worm 20. Worm 20 meshes with a worm wheel 21 attached to one end of a shaft 23 rotatably mounted in suitable brackets 24, which are attached to a supporting plate 25 mounted in any suitable manner within the camera casing 11. The other end of shaft 23 has pinned thereto a worm 26 which meshes with a large worm wheel 27 rotatably mounted on a stud 28 (Figure 3) carried by a bracket 29 which is supported by plate 25 (Figure 2).

Referring back to Figure 3, the underside of worm wheel 27 carries an annular ratchet 30, one of the teeth of which is engaged by a tooth 31 formed on a cam 32 when the cam is forced upwardly in a manner, and for a purpose, to be described. Cam 32 is secured to the upper end of the armature 33 of a solenoid 34 which is secured to supporting plate 25. The lower end of armature 33 extends through the bottom of the solenoid casing and rests on one end 35a of a lever 35 which is fulcrumed on a pin 36 to a bracket 37 which may be attached to the solenoid casing in any suitable manner. The other end 35b of lever 35 supports the lower end of a compression spring 38, the upper end of which encircles a pin 39 carried by a flange 40, which may be a part of bracket 37. Thus spring 38 imparts a constant counterclockwise bias to lever 35, as viewed in Figure 3, tending accordingly to force solenoid armature 33 and cam 32 upwardly so as to engage tooth 31 with ratchet 30. This condition pertains when solenoid 34 is deenergized. When, however, the solenoid is energized, which is its condition while the pilot's stick switch is on, the cam and ratchet are separated, as shown in Figure 3. When, however, the pilot releases his stick switch, the cam and ratchet are engaged, the cam accordingly being driven until it breaks the circuit of the camera motor, all as will be described hereinbelow.

Figure 2:
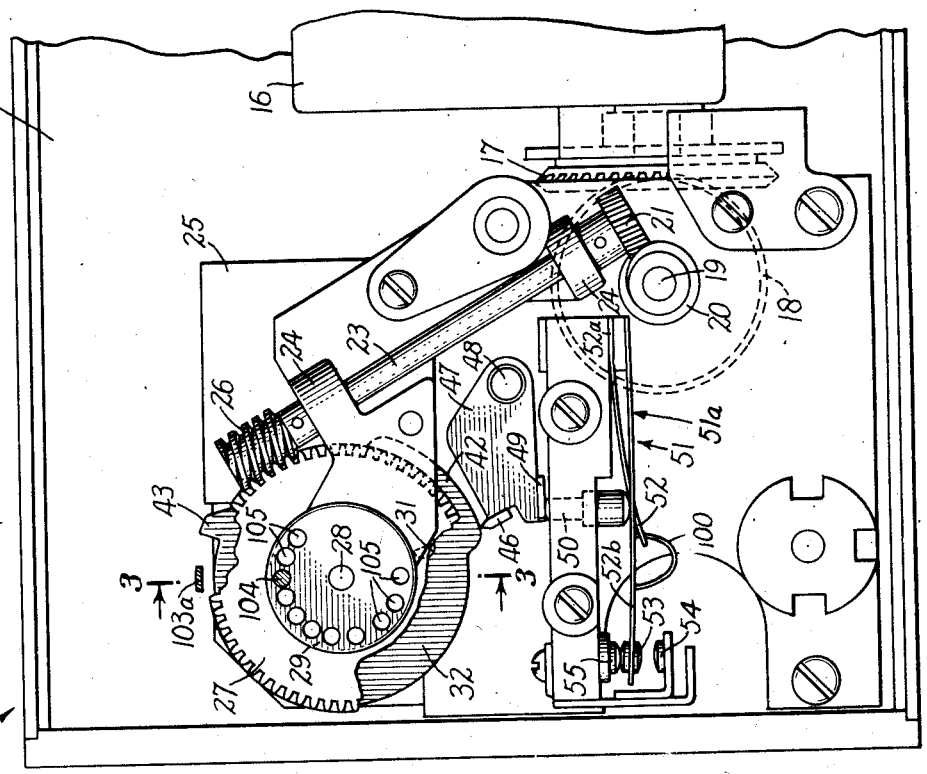
Figure 2 is a substantially enlarged view of a portion of the operating mechanism of our camera, this being a plan view of the upper end of the camera as viewed in Figure 1, with the cover plate removed.

The lower end of solenoid armature 33 is slotted, as at 33a, and this slot receives one end of a torsion spring 41, the other end of which abuts against a portion of bracket 37, the spring accordingly biasing the armature and hence cam 32 counterclockwise, as viewed in Figure 2. Thus it may be seen that the camera motor drives the cam in one direction, namely clockwise, whereas spring 41 (Figure 3) drives the cam in the opposite direction, the former movement acting to deenergize the motor, and the latter acting to energize the motor.

As shown in Figure 2, cam 32 is provided with an arcuate lobe 42 and a tooth 43. According to the position of the cam, lobe 42 engages a lip 46 which is carried by and extends upwardly from a lever 47 pivoted on a pin 48 carried by plate 25. When lip 46 is so engaged, the lever is rocked counterclockwise. Lever 47 also includes an upstanding flange 49 adapted to engage with one end of a plunger 50 reciprocably mounted in the body of a micro-switch, generally indicated at 51. The other end of plunger 50 engages a switch arm 52, one end 52a of which is fastened to the body of switch 51. Switch 51 includes another switch arm 51a, which carries a contact button 53. Contact button 53 is engageable with either of a pair of stationary contacts 54 and 55, the former of which when engaged by contact 53 completes a circuit to a heater, as will be described. When contacts 53 and 55 engage, the circuit to motor 16 is completed. It may now be seen that when cam lobe 42 engages lip 46, lever 47 is rocked counterclockwise so that its flange 49 forces plunger 50 against arm 52, causing contacts 53 and 54 to engage. When, however, lobe 42 disengages lip 46, contacts 53 and 55 engage. These contacts so engage by reason of a spring 100, having one end connected to switch arm 51a and its other end connected to the end of switch arm 52 in the conventional manner of micro-switches of this character.

The operation of the structure described above will be described in connection with the wiring diagram shown in Figure 6. The pilot's stick switch is generally indicated at 56 and has two arms 56a and 56b. One arm 56b thereof is in the circuit of a solenoid 57 connected across source 61 by lines 57a and 57b so that when switch 56 is closed the solenoid is energized, causing a gun 58 to fire. One side of switch arm 56a is connected by a line 59 through the camera on-and-off switch 60 and a fuse 59a to one side of a source of power 61. The other side of source 61 is connected by a line 62 to a terminal 63 of a camera socket 64. This terminal is connected by a line 65 to one side of an overload cutout 66. To the same side of cutout 66 is attached a line 67 which connects line 65 with one side of solenoid 34. The other side of solenoid 34 is connected by a line 68 to another terminal 69 of socket 64 which is in turn connected to the other side of switch arm 56a by a line 70. It may now be seen that when stick switch 56 and accordingly arms 56a and 56b are closed, both of solenoids 34 and 57 are connected to source 61 so as to be energized thereby, assuming, of course, that the camera switch 60 is closed.

As noted hereinabove, when solenoid 34 is energized, its armature 33 is drawn downwardly, as viewed in Figure 6, so that it may be rotated counterclockwise, as viewed in Figure 6, by spring 41. The armature, and accordingly cam 32, are thus rotated until cam hook 43 engages a lever end 103a (Figures 2 and 3) which, as described below, may be selectively positioned to control the extent of the interval. When hook 43 and lever end 103a (Figure 2) engage, contacts 53 and 55 close under the bias of spring 100, cam lobe 42 having moved away from lever lip 46. Contact 55 (Figure 6), hereinafter referred to as the motor contact, is connected by a line 71 to one side of motor 16, the other side of the motor being connected by a line 72 to the overload cutout 66 and thence by line 65, socket terminal 63 and line 62 to one side of source 61. The moving contact 53 is connected through switch arm 52 to a line 73 which is in turn connected to a terminal 74 of the camera socket 64, this terminal being connected by a line 75 to the camera on-and-off switch 60 and accordingly to the other side of source 61. Thus it will appear that when cam 32 is rotated counterclockwise by spring 41 upon energization of solenoid 34, contacts 53 and 55 close to complete the circuit to motor 16. It will also appear that this ultimate effect is attained upon closing of the pilot's stick switch 56.

When the pilot's stick switch 56 is opened, gun solenoid 57, as well as solenoid 34, is deenergized, so that the gun immediately ceases firing and solenoid armature 33 is forced upwardly by spring 38, as hereinbefore described. Contacts 53 and 55, however, remain closed, and accordingly motor 16 continues to operate the camera. When the solenoid armature 33 is forced upwardly, cam tooth 31 engages ratchet 30 which, being driven by the motor, rotates cam 32 clockwise, as viewed in Figure 6, until cam lobe 42 engages lever 47 to rock the lever counterclockwise, as viewed in Figure 2. When this occurs, contacts 53 and 55 are separated, as viewed in Figure 6, contact 53 being forced into engagement with contact 54. Thus the circuit of motor 16 is broken, and the motor and accordingy the camera almost immediately stop operating. It follows then that the camera motor continues to operate the camera after the gun ceases firing for as long a time as it takes to drive cam lobe 42 into engagement with lever 47. This period of overrun may be set within limits as desired by mechanism shown in Figure 3.

As shown in Figure 1, the camera case 11 supports a knob 101 mounted on a shaft 102, extending through the case to a position adjacent the top of stud 28 (Figure 3), the knob being graduated in intervals of half seconds. The inner end of shaft 102 has fastened thereto a lever 103 having a downwardly extending portion 103a, which lies in the path of movement of cam hook 43. Lever 103 also carries a pin 104 which may be set in any of a number of holes 105 drilled in plate 29, so that the interval setting assembly may be positioned as desired, thus locating lever end 103a in various positions about cam 32. A spring 106 is interposed between the top of lever 103 and camera case 11, so as to hold pin 104 in its set position. It will thus appear that since lever end 103a may engage cam hook 43, rotation of knob 101 will control the angle between cam lobe 42 and lip 46 of lever 47 (see Figure 2), thus determining the overrun interval. Although the setting of knob 101 and accordingly lever 103 may be made at any time, it should be done only after the motor has been shut off by the overrun control. Hence, the overrun period can be increased by lifting and rotating knob 101 counterclockwise, and may be decreased by rotating the knob clockwise, all as viewed in Figure 2.

As noted hereinabove, contact 54 is in the circuit of a heater 76, being connected to one side thereof by a line 77. The other side of the heater is connected by a line 78 through a cutout 79 to a line 180, which is in turn connected to line 67 and hence by way of line 65, socket terminal 63 and line 62 to one side of source 61. Contact 53 is connected to the other side of source 61, as heretofore described, so that when contacts 53 and 54 engage, heater 76 is energized, assuming that cutout 79 is closed. Cutout 79 is preferably a thermostat which keeps the heater circuit open above a selected critical temperature. It may now be seen that when the motor circuit is closed, the heater circuit is open, and vice versa. Hence, the temperature within the camera is maintained at a sufficiently high value to assure dependable operation.

It is desirable that the developed film indicate the period of overrun, i. e., the interval of time that the camera is operating after the gun ceases to fire. To this end, we have provided a lever 80 which is pivotally mounted on a pin 81 carried by bracket 37. The free end 80a (Figure 4) of this lever has fastened thereto a wire 82, the lever also being provided with an elongated slot 83 through which extends a pin 84 fastened to lever 35 so as to move therewith. Thus when solenoid 34 (Figure 3) is deenergized upon release of the pilot's stick switch, as described, which deenergization marks the beginning of the overrun period, lever 35 is free to rock counterclockwise under the push of spring 38. This causes pin 84 to rock lever 80 clockwise so that the wire 82 is extended through a hole 86 into the space between the camera shutter and the film, so that the end of the wire is photographed, thus to provide an indication on the film of the overrun interval. The wire, of course, remains in this position after the camera stops operating, but when the pilot closes stick switch 56 again solenoid 34 is, of course, energized, as hereinbefore described. It will be recalled that energization of this solenoid rocks lever 35 clockwise, as viewed in Figure 3, which movement is imparted by way of pin 84 to lever 80 to rock this latter lever counterclockwise, thus lifting pin 82 from between the camera shutter and film.

It will now appear that we have provided a camera which fulfills the objects hereinabove set forth in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

We claim:

1. In camera construction, in combination, a motor, a first circuit including a first switch for said motor, a solenoid, a second circuit including a second switch for said solenoid, means movable between switch opening and closing positions and responsive to energization of said solenoid for closing said first switch thereby to effect energization of said motor, and means forming a driving connection between said responsive means and said motor upon opening of said second switch and consequent deenergization of said solenoid for driving said responsive means to switch opening position through a predetermined interval of time.

2. Apparatus according to claim 1 wherein said responsive means comprises a cam mounted on the armature of said solenoid, a spring for forcing said cam to a normally stationary position upon deenergization of said solenoid, and a second spring for rotating said solenoid armature and accordingly said cam upon energization of said solenoid, thereby to drive said cam to its switch closing position to energize said first circuit.

3. In camera construction, in combination, a motor, a first circuit including a first switch for said motor, a solenoid, a second circuit including a second switch for said solenoid, means including a cam associated with said first switch and movable between switch opening and switch closing position, a spring for moving said cam to switch closing position, means forming a disconnectable driving connection between said motor and said cam whereby said motor may drive said cam to switch opening position, means responsive to energization of said solenoid for disconnecting the driving connection between said cam and said motor whereby said cam is under the sole influence of said spring, and means operable upon deenergization of said solenoid for connecting said driving connection whereby said motor drives said cam against the bias of said spring to its switch opening position.

4. Apparatus according to claim 3 wherein there is provided indicator means movable into an identifiable position, and means connected with said responsive means for moving said indicator means into said position upon deenergization of said solenoid, whereby said indicator means may be identified thereby to indicate the occurrence of said time interval.

5. In camera construction, in combination, a motor, a first circuit including a first switch for said motor, energizable means, a second circuit including a second switch for said energizable means, second energizable means connected to said second circuit for energization upon closing of said second switch, means movable between switch opening and closing positions and responsive to energization of said first energizable means for closing said first switch, thereby to effect energization of said motor, and means forming a driving connection between said responsive means and said motor upon opening of said second switch and consequent deenergization of both of said energizable means for driving said responsive means to its switch opening position whereby said motor circuit is deenergized subsequent to deenergization of said second circuit.

6. In camera construction, in combination, a motor, a first circuit including a first switch for said motor, a solenoid, a second circuit including a second switch for said solenoid, means movable between switch opening and closing positions and responsive to energization of said solenoid for closing said first switch thereby to effect energization of said motor, means forming a driving connection between said responsive means and said motor upon opening of said second switch and consequent deenergization of said solenoid for driving said responsive means to switch opening position through a predetermined interval of time, and means for moving said movable means to switch closing position.

7. In camera construction, in combination, a motor, a first circuit including a first switch for said motor, a solenoid, a second circuit including a second switch for said solenoid, means movable between switch opening and closing positions and responsive to energization of said solenoid for closing said first switch thereby to effect energization of said motor, menas forming a driving connection between said responsive means and said motor upon opening of said second switch and consequent deenergization of said solenoid for driving said responsive means to switch opening position through a predetermined interval of time, said movable means including a rotatable cam having a lobe operatively associated with said first switch, and spring means for rotating said cam upon energization of said solenoid to effect closing of said first switch.

8. In camera construction, in combination, a motor, a first circuit including a first switch for said motor, electromotive means, a second circuit including a second switch for said electromotive means, means movable between switch opening and closing positions and responsive to energization of said electromotive means for closing said first switch, thereby to effect energization of said motor, and means forming a driving connection between said responsive means and said motor upon opening of said second switch and consequent deenergization of said electromotive means for driving said responsive means to switch opening position through a predetermined interval of time.

9. Apparatus according to claim 8 wherein said driving connection comprises a rotatable gear wheel located adjacent said movable means, and reduction gearing connecting said motor and said gear.

10. In camera construction, in combination, a motor, a first circuit including a first switch for said motor, electromotive means, a second circuit including a second switch for said electromotive means, means movable between switch opening and closing positions and responsive to energization of said electromotive means for closing said first switch, thereby to effect energization of said motor, means forming a driving connection between said responsive means and said motor upon opening of said second switch and consequent deenergization of said electromotive means for driving said responsive means to switch opening position through a predetermined interval of time, and means for indicating the pendency of said interval of time.

11. In apparatus of the character described, in combination, an electric motor, a first circuit energizable to actuate said motor, a second circuit, means including a normally open switch in said first circuit, a solenoid in said second circuit energized upon energization of said second circuit, normally stationary switch opening and closing means movable in response to energization of said solenoid from its stationary position, means operable upon energization of said solenoid for driving said normally stationary means to switch closing position to effect energization of said first circuit, and means connecting said motor with said normally stationary means upon deenergization of said solenoid for driving said normally stationary means to switch opening position, whereby said first circuit is deenergized subsequent to deenergization of said second circuit.

12. Apparatus according to claim 11 wherein the normally stationary means comprises a cam having a lobe thereon which upon energization of said solenoid is operable to effect closing of said switch to energize said first circuit, and which upon deenergization of said solenoid is operable to effect opening of said switch to deenergize said first circuit.

13. Apparatus according to claim 11 wherein the normally stationary means comprises a cam mounted on the armature of said solenoid, spring means for forcing said cam to its normally stationary position upon deenergization of said solenoid, and a second spring for rotating said solenoid armature and accordingly said cam upon energization of said solenoid thereby to drive said cam to its switch closing position to energize said first circuit.

CARL V. JOHNSON.
WILLIAM G. HERBSTREIT.

REFERENCES CITED

The following references are of record in the file of this patent:

UNITED STATES PATENTS

| Number | Name | Date |
|---|---|---|
| 1,440,803 | Uphoff | Jan. 2, 1923 |
| 1,773,130 | Denniston | Aug. 19, 1930 |
| 2,342,509 | Gaty et al. | Feb. 22, 1944 |
| 2,342,510 | Fischer et al. | Feb. 22, 1944 |
| 1,465,087 | Merrill | Aug. 14, 1923 |